Patented Mar. 3, 1925.

1,528,395

UNITED STATES PATENT OFFICE.

FRED K. BEZZENBERGER, OF CLEVELAND, OHIO, ASSIGNOR TO RAY S. GEHR, TRUSTEE, OF CLEVELAND, OHIO.

PROCESS OF MAKING ANTIMONY SULPHURETS.

No Drawing.  Application filed January 16, 1924. Serial No. 686,672.

*To all whom it may concern:*

Be it known that I, FRED K. BEZZENBERGER, a citizen of the United States, residing at Cleveland, in the county of Cuyahoga and State of Ohio, have invented certain new and useful Improvements in Processes of Making Antimony Sulphurets, of which the following is a specification.

This invention relates to the production of vulcanizing agents and particularly the so called antimony sulphurets.

The present application constitutes in part a continuation of my earlier filed application, Serial No. 544,365, relating to the same invention.

The antimony sulphurets that have been most largely used in the vulcanization of rubber consist of intimate mixtures of antimony pentasulphide ($Sb_2S_5$), precipitated sulphur and an inert filler or loader. These sulphurets are often referred to in the trade as golden antimony because the material has a golden red or orange color and imparts that color to the rubber. In some cases the inert filler or loader is omitted but as the fillers used are ordinarily white or substantially colorless the color of the sulphuret, and also of the vulcanized rubber, is determined chiefly by the antimony sulphide whether it be combined with a filler or not.

Rubber manufacturers in order to secure distinctive colors for their products have in some cases combined some other coloring agent with the golden antimony so as to modify the color of the rubber stock produced. For example, some have mixed crimson antimony sulphide with the golden antimony for the purpose stated. But whatever the mixture employed, the practice is found to result in added labor and expense and those manufacturers who have in the manner stated established on the market rubber goods with distinctive colors would gladly use, in lieu of their special mixtures, a simple antimony sulphuret capable of giving them rubber of a similar color.

The object of the present invention is to provide an improved process of producing antimony pentasulphide by which the color of the product, and of the rubber stock vulcanized with it, can be varied through a wide range from a light golden red or orange to a very deep or dark red.

In carrying out my invention I make use of the method of precipitating antimony pentasulphide and sulphur set forth in my copending application Serial No. 596,520. That is to say, I dissolve sulphur flowers and stibnite ($Sb_2S_3$) in a strong solution of sodium sulphide in the proportions indicated by the following reactions:

(1) $3Na_2S + 2S + Sb_2S_3 = 2Na_3SbS_4$
(2) $Na_2S + 2S = Na_2S_3$

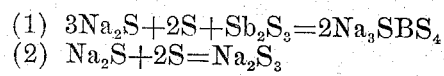

These reactions are carried out in a boiling solution and are completed by boiling about one hour. The solution is then diluted to such an extent that no crystallization will take place on cooling to room temperature, and is then allowed to stand several hours to permit the precipitate to settle. The dilution of the solution just referred to is either carried just far enough to prevent crystallization, in which case the solution is substantially saturated, or is carried more or less farther, as will presently be explained in connection with the color control of the ultimate product.

After the solution has stood several hours for settling, the clear liquid is drawn off and run into an acid solution capable of reacting with the sodium thio-antimonate and the sodium polysulphide to form antimony pentasulphide, sulphur, hydrogen sulphide and a soluble sodium salt. Any one of the three mineral acids, sulphuric, nitric and hydro-chloric, and also other acids such as acetic, will serve this purpose. It is to be noted, however, that nitric acid, or any strongly oxidizing acid, must be used in suitably diluted form. Of all of the usable acids, I prefer one of the mineral acids and especially sulphuric acid on account of its low cost. Thus in the preferred procedure the clear solution of sodium thio-antimonate and sodium polysulphide is run into an excess of dilute sulphuric acid at a preferable temperature of about 20° C., whereupon the following reactions take place:

(3) $2Na_3SbS_4 + 3H_2SO_4 = 3Na_2SO_4 + Sb_2S_5 + 3H_2S$
(4) $Na_2S_3 + H_2SO_4 = Na_2SO_4 + 2S + H_2S$

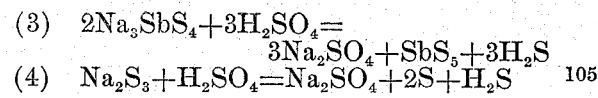

As a result of these last two reactions precipitates of antimony pentasulphide and free sulphur are thrown down together, the sodium sulphide is held in solution and the hydrogen sulphide is evolved as a gas. Preferably the hydrogen sulphide values are recovered by passing the gas through towers containing caustic soda to form sodium sulphide for use in the first part of the process.

The precipitate of antimony pentasulphide and sulphur is now washed free from soluble salts by decantation or on a filter, as is most convenient or economical under the circumstances. In either case the result is an intimate mixture of antimony sulphide and precipitated sulphur in sludge form.

If the sulphuret is to be used without an inert or mechanical filler, the sludge is filtered, dried and pulverized and is then ready for use.

If, however, it is desired to have a mechanical filler in the product I prefer to follow the process set forth in my co-pending application Serial No. 596,520 above referred to. That is to say, instead of drying and pulverizing the antimony pentasulphide and sulphur sludge, I leave it in sludge form and have in preparation, meanwhile, an inert finely divided filler in the form of a carbonate of a metal of the alkaline earth group, preferably carbonate of calcium. The preferred procedure in preparing the calcium carbonate is as follows:

Substantially saturated equi-molal solutions of soda ash and calcium chloride are mixed together at a temperature ranging between 34° C. and 45° C. and preferably between 35° C. and 37° C. The solutions are brought together as quickly as possible and stirred vigorously for about ten minutes after mixing. Then, while still stirring, water is turned into the mass to bring the volume to about five times the volume of the mixed solutions. Under the conditions specified calcium carbonate is precipitated in particles that are exceedingly small and relatively uniform as to size. By turning water into the solution and largely increasing its volume as specified the exceedingly small particles of the precipitate are separated and homogenous suspension is secured. The calcium carbonate thus formed in suspension is next allowed to settle and is then washed, either by decantation or on the filter, free from chlorides thus leaving it in the form of a sludge. In the mixing of the calcium chloride and soda ash solutions the former is turned into the latter and is preferably used in slight excess inasmuch as the chloride washes out from the precipitate more thoroughly than the alkali carbonate, and it is important that the precipitate be free from alkalinity to avoid affecting the color value of the final product. The amounts of chloride and soda ash used are determined, of course, by the carbonate content desired in the final product.

The two sludges produced as above described are now thoroughly mixed together and the mixture filtered and dried. The dried product is then pulverized, preferably by passing it through a pulverizer of the air separation type, and is then ready for use.

It should be understood that I use the term "sludge" in a broad sense indicating any water mixture of the material in question and do not intend to indicate by it any particular consistency. The sludge can be made with any amount of water that will effect an intimate mixture of the materials to be brought together. The more water one uses, the more readily such mixture is effected. Furthermore, if one of the materials to be mixed, the pentasulphide-sulphur material, for example, is distributed through a rather large volume of water, the mixture in sludge form can be effected by gradually adding to said volume the other material in dry form, with vigorous agitation of the liquid meanwhile. As a general rule, however, I prefer to have each of the two materials in sludge form before bringing them together. In whatever way the sludge mixture is formed care should be had to insure the intimate mixture of the materials when dried.

In connection with the preparation of the antimony pentasulphide and sulphur sludge I have discovered—and this is the main feature of my present invention—that the color of the pentasulphide precipitate is dependent upon the concentration of the sodium thioantimonate-polysulphide solution which is turned into the acid. That is to say, if the said solution is diluted just enough to prevent crystallization on cooling, as above described, the solution of course will be substantially saturated; and under these conditions I secure a pentasulphide precipitate of a golden red or orange color. If, however, the dilution of the thioantimonate-polysulphide solution is carried farther the color of the pentasulphide precipitates secured is a darker or deeper red, and the difference in the colors due to increased dilution is roughly proportional to such dilution or, in other words, inversely proportional to the concentration of said solution.

By thus varying the concentration of the thioantimonate-polysulphide solution I am enabled to closely control the color of the resulting product over a wide range of light orange at one end of the range to a deep dark red at the other end.

In order that the manner of carrying out my invention may be quite clearly understood I will here state the amounts of the various raw materials suitable for the production of a particular sulphuret, and will then describe the modifications in the procedure necessary to modify the color of the product. Let it be assumed that the percentage composition by weight of the desired antimony sulphuret is—

$Sb_2S_5$—37%
S—13%±0.5%
$CaCO_3$—50%

Then to produce 100 lbs. of the sulphur, materials are used in the following amounts:

| | Lbs. | Ozs. |
|---|---|---|
| Fused sodium sulphide (57½% $Na_2S$) | 65 | 4 |
| Sulphur flowers | 19 | 0 |
| Stibnite (97½% $Sb_2S_3$) | 32 | 0 |
| Water, 12 gallons. | | |

(After dissolving the sodium sulphide, sulphur and stibnite by boiling, the solution is diluted to 50 gallons, to settle.)

| | | |
|---|---|---|
| $H_2SO_4$ (93%) | 56 | 0 |
| Calcium chloride (71.4% $CaCl_2$) | 78 | 0 |
| Soda ash (98% $Na_2CO_3$) | 54 | 0 |

The pentasulphide-sulphur precipitate produced by the use of the materials in the amounts indicated is characterized by a light orange color because the dilution of the thioantimonate-polysulphide solution to 50 gallons as specified makes such solution substantially saturated. If, instead of diluting the solution to 50 gallons volume, it is diluted to 200 gallons volume, which renders the solution about 25% saturated, the pentasulphide-sulphur precipitate secured is characterized by an exceedingly deep or dark red color. By varying the dilution between the limits of 50 gallons and 200 gallons specified, a graduated series of colors or shades of the pentasulphide-sulphur precipitate is secured, the depth of the color being roughly proportional to the degree of dilution, or inversely proportional to the concentration, of the solution.

The different shades or colors of pentasulphide produced by my improved process when compounded with rubber, give corresponding series of colors in the vulcanized rubber stock and the rubber manufacturer is thus enabled, by means of the different colored sulphurets produced by my process to match colors which were previously produced by the use of golden antimony combined with various other coloring agents, with a resultant decrease in his manufacturing costs. Other advantages incident to the color control of the sulphuret will be appreciated by those familiar with the rubber trade.

It will of course be understood that sulphurets with various compositions, and either with or without a mechanical filler, can be produced by the use of suitable amounts of the raw materials used, the amounts specified above being simply by way of example. It will also be obvious that the procedure in carrying out my improved process can be varied within the scope of the appended claims.

What I claim is:

1. In the process of producing antimony sulphuret by treating an antimonate solution with an acid, the method of controlling the color of the sulphuret precipitate which comprises decreasing and increasing the concentration of the antimonate solution to respectively deepen or lighten the color of said precipitate.

2. In the process of producing antimony sulphuret by treating an antimonate solution with a mineral acid, the method of controlling the color of the sulphuret precipitate which comprises decreasing or increasing the concentration of the antimonate solution to respectively deepen or lighten the color of said precipitate.

3. In the process of producing antimony pentasulphide by treating sodium antimonate solution with sulphuric acid, the method of controlling the color of the pentasulphide precipitate which comprises decreasing or increasing the concentration of the antimonate solution to respectively deepen or lighten the color of said precipitate.

4. In the process of producing antimony sulphuret by treating the solution of an antimonate and a polysulphide with an acid to form a precipitate of antimony pentasulphide and sulphur, the method of controlling the color of said precipitate which comprises decreasing or increasing the concentration of the antimonate-polysulphide solution to respectively deepen or lighten the color of said precipitate.

5. In the process of producing antimony sulphuret by treating a solution of sodium antimonate and sodium polysulphide with sulphuric acid to form a precipitate of antimony pentasulphide and sulphur, the method of controlling the color of said precipitate which comprises decreasing or increasing the concentration of the antimonate-polysulphide solution to respectively deepen or lighten the color of said precipitate.

6. In the process of producing antimony sulphuret by treating an antimonate solution with an acid, the method of controlling the color of the sulphuret precipitate which comprises decreasing or increasing the concentration of the antimonate solution substantially in proportion to the desired increase or decrease, respectively, to be effected in the depth of the color of the precipitate.

7. In the process of producing antimony sulphuret by treating an antimonate solution with a mineral acid, the method of controlling the color of the sulphuret precipitate which comprises decreasing or increasing the concentration of the antimonate solution substantially in proportion to the desired increase or decrease, respectively, to be effected in the depth of the color of the precipitate.

8. In the process of producing antimony pentasulphide by treating sodium antimonate solution with sulphuric acid, the method of controlling the color of the pentasulphide precipitate which comprises decreasing or increasing the concentration of the antimonate solution substantially in proportion to the desired increase or decrease, respectively, to be effected in the depth of the color of the precipitate.

9. In the process of producing antimony sulphuret by treating the solution of an antimonate and a polysulphide with an acid to form a precipitate of antimony pentasulphide and sulphur, the method of controlling the color of said precipitate which comprises decreasing or increasing the concentration of the antimonate-polysulphide solution substantially in proportion to the desired increase or decrease, respectively, to be effected in the depth of the color of the precipitate.

10. In the process of producing antimony sulphuret by treating a solution of sodium antimonate and sodium pentasulphide with sulphuric acid to form a precipitate of antimony pentasulphide and sulphur, the method of controlling the color of said precipitate which comprises decreasing or increasing the concentration of the antimonate-polysulphide solution substantially in proportion to the desired increase or decrease, respectively, to be effected in the depth of the color of the precipitate.

In testimony whereof, I hereunto affix my signature.

FRED K. BEZZENBERGER.